United States Patent [19]
Chiba et al.

[11] Patent Number: 6,025,445
[45] Date of Patent: Feb. 15, 2000

[54] CURABLE COMPOUND

[75] Inventors: Makoto Chiba; Toshihiko Okamoto, both of Kobe; Masashi Sakaguchi, Kakogawa; Jyunji Takase, Akashi, all of Japan

[73] Assignee: Kaneka Corporation, Osaka, Japan

[21] Appl. No.: 08/963,354

[22] Filed: Nov. 3, 1997

[30] Foreign Application Priority Data

| Nov. 1, 1996 | [JP] | Japan | 8-291536 |
| Nov. 5, 1996 | [JP] | Japan | 8-293043 |
| Nov. 5, 1996 | [JP] | Japan | 8-293044 |
| Nov. 20, 1996 | [JP] | Japan | 8-308870 |

[51] Int. Cl.$^7$ ................................... C08F 30/08
[52] U.S. Cl. ........................... 525/326.5; 528/17; 528/18
[58] Field of Search .................... 525/326.5; 528/17, 528/18

[56] References Cited

FOREIGN PATENT DOCUMENTS

| 0 268 780 | 6/1988 | European Pat. Off. | C08L 71/00 |
| 56-163143 | 12/1981 | Japan . | |
| 60-006045 | 2/1985 | Japan . | |
| 60-262829 | 12/1985 | Japan . | |
| 1-165649 | 6/1989 | Japan . | |
| 2-185549 | 7/1990 | Japan . | |
| 7-33984 | 2/1995 | Japan . | |

OTHER PUBLICATIONS

Database WPI XP–002066487/JP 03 111 432 A abstract, May 13, 1991.

*Primary Examiner*—Robert Dawson
*Assistant Examiner*—D. Aylward
*Attorney, Agent, or Firm*—Pollock, Vande Sande & Amernick

[57] ABSTRACT

The curable compound of the invention is used as a two-part or many-part curable compound, and water or a hydrated metal salt is added to the curing agent containing a silanol condensation catalyst.

Thus, the compound of the invention is a curable compound comprising at least two components: (A) a main ingredient which contains a saturated hydrocarbon polymer containing silicon-containing groups which have hydrolyzable groups bonded to the silicon atom and which are crosslinkable by forming siloxane bonds, and (B) a curing agent containing a silanol condensation catalyst and water or a hydrated metal salt.

7 Claims, No Drawings

CURABLE COMPOUND

FIELD OF THE INVENTION

The present invention relates to a curable compound comprising at least two components containing a saturated hydrocarbon polymer having silicon-containing groups which have hydrolyzable groups bonded to the silicon atom and which are crosslinkable by forming siloxane bonds.

BACKGROUND ART

A silicon-containing group (hereinafter, refereed to as a reactive silicon group), which has a hydrolyzable group bonded to the silicon atom and which is crosslinkable by forming a siloxane bond, is a well-known functional group represented, for example, by —$Si(OCH_3)_3$.

This functional group is a group which is hydrolyzed by moisture in air and form —$Si(OH)_3$ and the like, that produces a siloxane bond (Si—O—Si) by silanol condensation reaction with other reactive silicon groups.

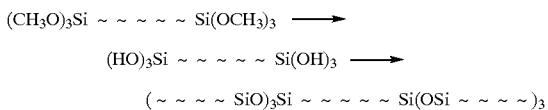

Accordingly, the polymer containing the reactive silicon group can be cross-linked and cured in the presence of moisture at ambient temperature. Among such polymers, a polymer the main chain of which is a rubber-like polymer is a viscous liquid at room temperature, and is characterized by becoming a rubbery elastic materials upon curing and is widely used as a sealing material in a construction industry and other industries. The sealing material is used in order to maintain watertight or airtight of construction materials such as wall materials by filling up gaps (seams) thereof with the sealing material and curing it.

Among such rubber-like polymer, a saturated hydrocarbon polymer such as polyisobutylene is a polymer which can form a cured product excellent in weather resistance, heat resistance and gas barrier character. There is a problem, however, that it takes a long time for one week or more until the inside of the sealing material can be cured though the curing at the surface can be proceeded smoothly when the sealing material is cured by moisture in air because the moisture barrier character is also large due to the large gas barrier character. On this account, a compound excellent in curability of a deep part, which can be smoothly cured to the inside at normal temperature by dispersing a hydrated metal salt in the compound, is proposed (Japanese Kokai Publication Hei-2-185565).

By the way, it occurs quite often that a polymer containing reactive silicon groups is used as a compound to which a silanol condensation catalyst as a curing catalyst, filler, plasticizer and the like are added. A curable compound can be roughly classified into a one-part curable compound and a two-part curable compound.

The one-part curable compound is convenient because it is a liquid-like substance comprising one component which is mixed with all additives as described above and it does not needs to be mixed at the time of use, but it must be stored in a completely dried state not to be cured before use. The two-part curable compound is inconvenient because it is need to be mixed at the time of use, but it is not needed to be dehydrated completely like the one-part one because the polymer having the reactive silicon groups is hard to be cured in the presence of some moisture and in the absence of the silanol condensation catalyst.

When the above-mentioned hydrated metal salt or water is used as a source of water to cure the polymer, the one-part curable compound can not be applied. This is because curing reaction starts immediately after the polymer, the silanol condensation catalyst and water are mixed together.

A titanium compound or a tin compound is also often used as the silanol condensation catalyst, and many of these compounds are decomposed by moisture. Thus it is expected that these silanol condensation catalyst is also decomposed by the hydrated metal salt. Accordingly, when the hydrated metal salt is used as a source of water, it must be added to a curable compound just before use (curing) or be added to a main ingredient containing the polymer in case of the above-mentioned two-part compound.

It is inconvenient, however, that only the hydrated metal salt is mixed just before use. In case where it is combined with the main ingredient, there is a problem that a viscosity of the main ingredient increases due to proceeding slightly in curing of the polymer containing the reactive silicon groups.

Furthermore, a silane-coupling agent is often used jointly in sealing material as an adhesion promoter. There is a problem, however, that the silane-coupling agent cannot be combined with both the main ingredient and the curing agent even if it is necessary to be used as an additive because it is easily reacted with water. For example, when a silane-coupling agent such as γ-isocyanatepropyltrimethoxysilane, $ONCCH_2CH_2CH_2Si(OCH_3)_3$, is added to the main ingredient, it reacts with the hydrated metal salt, and when it is added to the curing agent, it is decomposed by the silanol condensation catalyst. Thus it loses a role of imparting adhesiveness as a silane-coupling agent.

SUMMARY OF THE INVENTION

One object of the present invention is to propose a novel curable compound using a hydrated metal salt as a source of water. Another object of the invention is to propose a curable compound the viscosity of which does not increase during storage. A third object of the invention is to propose a curable compound which can be combined with a compound having reactive silicon groups easy to react with water, such as a silane-coupling agent.

It has been generally thought that a silanol condensation catalyst, which has character of easily reacting with water, might react with water of a hydrated substance and might deteriorate. Accordingly, it might be difficult that a man concerning in this field has an idea that a mixture of the silanol condensation catalyst and a hydrated metal salt may be used as a curing agent. But after making much effort, inventors of the present invention have made it clear that even if the silanol condensation catalyst is mixed with water or the hydrated metal salt, curability of the silanol condensation catalyst is hardly influenced. Based on this information, the inventors have found that it is possible to prepare a curable compound comprising at least two components using a curing agent in which the silanol condensation catalyst is blended with water or the hydrated metal salt, and that the afore-mentioned objects can be solved by using this compound.

Thus, the present invention relates to a curable compound comprising at least two components;

(A) a main ingredient which contains a saturated hydrocarbon polymer containing silicon-containing groups which have hydrolyzable groups bonded to the silicon atom and which are crosslinkable by forming siloxane bonds, and (B) a curing agent containing a silanol condensation catalyst and water or a hydrated metal salt.

The compound of the invention not only can solve the aforementioned objects but also has the following advantages that there is almost no decrease in the curability (curing rate) of the compound after storage and that the viscosity of the main ingredient decreases and the handling of the compound becomes easy by removing the hydrated metal salt from the main ingredient side.

DETAILED DESCRIPTION OF THE INVENTION

The present invention is hereinafter described in detail.

The saturated hydrocarbon polymer having the reactive silicon groups used for the invention is a polymer which does not contain substantially any carbon-carbon unsaturated bond except aromatic ring, and, as an example thereof, polyethylene, polypropylene, polyisobutylene, hydrogenated polybutadiene, hydrogenated polyisopren or the like can be mentioned.

As the reactive silicon group, a group represented by the general formula (1) shown below can be mentioned;

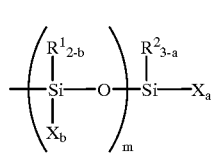

(1)

wherein $R^1$ and $R^2$ each is independently an alkyl group of carbon atoms 1 to 20, an aryl group of carbon atoms 6 to 20, an arakyl group of carbon atoms 7 to 20 or a triorganosiloxy group represented by $(R')_3SiO$— ($R$'s each is independently a substituted or unsubstituted hydrocarbon group of carbon atoms 1 to 20), X is the hydrolyzable group, a is either 0,1 or 2, b is either 0,1 or 2 and a and b do not become 0 simultaneously, and m is 0 or an integer of 1 to 19.

As an example of the hydrolyzible group), a conventional group such as a hydrogen atom, an alkoxy group, an acyloxy group, a ketoxymeto group, an amino group, an amide group, an aminoxy group, a mercapto group, an alkenyloxy group or the like can be mentioned. Among these, an alkoxy group, an amide group and an aminoxy group are preferable, and an alkoxy group is especially preferable because it is mild in its hydrolyzable character and is easy to be handled.

The number of the hydrolyzable groups which are bonded to one silicon atom can be within the range of 1–3, and the $(a+\Sigma b)$ is preferably within the range of 1–5. When two or more hydrolyzable groups are bonded to the reactive silicon group, they may be the same or different.

One or more silicon atoms are needed to form the reactive silicon groups, but, in case of silicon atoms connected by siloxane bond and the like, it is desirable that the number of silicon atoms is 20 or less. Especially, the reactive silicon group represented by the general formula (2) is preferable because it is easy to obtain;

(2)

wherein $R^2$, X and a are the same as the afore-mentioned groups.

The number of the reactive silicon groups in a molecule of the saturated hydrocarbon polymer is one or more, and it is preferable to be 1.1 to 5. If the number of the reactive silicon groups contained in a molecule is less than one, the curability becomes insufficient, and good rubber elasticity can not be obtained.

The reactive silicon groups can be at the ends or in the insides of the saturated hydrocarbon polymer chain or can be both at the ends and in the insides. In particular, the reactive silicon groups is desirable to be at the ends in that a rubber-like cured product of high strength and high elongation can be obtained easily because an effective amount of finally formed cross-linked chains of the saturated hydrocarbon polymers contained in the cured product may increase.

These saturated hydrocarbon polymers having the silicon reactive groups can be used singly or in combination of two or more.

The polymer used for the invention, which forms skeleton of the saturated hydrocarbon polymer having the reactive silicon groups, can be obtained by (1) polymerizing olefin compounds of carbon atoms 1–6 such as ethylene, propylene, 1-buten, isobutylene as the main monomer or (2) hydrogenating polymers obtained by homo-polymerization of diene compounds such as butadiene and isoprene or copolymerization of these diene monomers with the above-mentioned olefin compounds. An isobutylene polymer and a hydrogenated polybutadiene are preferable because not only it is easy to introduce functional groups into their ends and control their molecular weight but also it is possible to increase the number of terminal functional groups.

The isobutylene polymer can be a polymer all of monomer units of which may be an isobutylene unit or can contain a monomer unit copolymerizable with isobutylene monomer preferably within the range of 50% or less (% by weight, same hereinafter) of the isobutylene polymer, more preferably 30% or less, and the most preferably 10% or less.

As an example of such a monomer unit can be mentioned an olefin of carbon atoms 4–12, a vinyl ether, an aromatic vinyl compound, a vinylsilane compound, an allylsilane compound or the like can be mentioned. As a specified example of such a monomer unit, 1-buten, 2-buten, 2-methyl- 1-buten, 3-methyl-1-buten, pentene, 4-methyl-1-pentene, hexene, vinylcyclohexen, methyl vinyl ether, ethyl vinyl ether, isobutyl vinyl ether, styrene, α-methylstyrene, dimethylstyrene, monochlorostyrene, dichlorostyrene, β-pinene, indene, vinyl-trichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, allyltrichiorosilane, allylmethyldichlorosilane, allyldimethylchlorosilane, allyldimethylmethoxysilane, allyltrimethylsilane, diallyldichlorosilane, diallyldimethoxysilane, diallyldimethylsilane, γ-methacryloyloxypropyltrimethoxysilane, γ-methacryloyloxypropylmethyldimethoxysilane or the like.

When a vinylsilane or an allylsilane is used as the monomer copolymerizable with isobutylene, the silicon content increases, groups capable of acting as a silane-coupling agent increase in number, and the adhesive property of the obtained compound can be improved.

The hydrogenated polybutadiene and other saturated hydrocarbon polymers can also contain the monomers other than the main monomers like in case of the above-mentioned isobutylene polymer.

In the saturated hydrocarbon polymer having reactive silicon groups used for the invention, a small amount of polyene compounds such that its double bonds remain after polymerization, such as butadiene or isoprene, can be contained within such a range as the object of the invention can be achieved, a preferable range of which is not more than 10% by weight, more preferable not more than 5% by weight, and the most preferable not more than 1% by weight.

The preferable number average molecular weight of the saturated hydrocarbon polymer, preferably the isobutylene polymer or the hydrogenated butadiene polymer, is about 500 to 30,000, and liquid or fluid one having molecular weight of about 1,000 to 15,000 is more preferable in that it is easy to be handled and etc.

A process for producing the saturated hydrocarbon polymer having silicon reactive groups is hereinafter described.

Among the isobutylene polymer having silicon reactive groups, the isobutylene polymer having silicon reactive groups at the molecular chain ends can be obtained from polymers having terminal functional groups, more preferably from isobutylene polymers all ends of which are functional, which can be obtained by a polymerization method called an inifer method (a cation polymerization method using the specified compound called inifer, which acts as an initiator and as a chain transfer agent). For example, polyisobutylene having unsaturated groups at the chain ends can be obtained by dehydrohalogenation reaction of the said polymer or by introduction of unsaturated groups to the polymer, as described in Japanese Kokai Publication Sho-63-105005.

In the next step, the reactive silicon groups can be introduced into the polymer by reacting a hydrosilane compound (in which a hydrogen atom is bonded to a group represented by the general formula (1)) represented by the general formula;

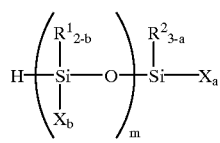

(wherein $R_1$, $R^2$, X, a and b is the same is described before), preferably a hydrosilane compound represented by the general formula;

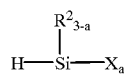

(wherein $R_1$, $R^2$, X, a and b is the same as described before) with the polymer via addition reaction called hydrosilylation reaction by using a platinum catalyst.

As an example of the hydrosilane compound, a halogenated silane such as trichlorosilane, methyldichlorosilane, dimethylcllorosilane, and phenyldichlorosilane; an alkoxysilane such as trimetlioxysilane, trietlioxysilane, methyldiethoxysilane, methyldimethoxysilane, and phenyldimethoxysilan; an acyloxysilane such as methyldiacetoxysilane, and phenyldiacetoxysilane; a ketoxymetosilane such as bis(dimetliylketoxymeto) methylsilane, and bis(cyclohexylketoxymeto)-methylsilane can be mentioned, but they are not limited to these compounds. Among these, a halogenated silane and an alkoxysilane are in particular preferable.

Examples of a producing process of these polymers are mentioned in Japanese Kokoku Publication Hei-4-69659, Japanese Kokoku Publication Hei-7-108928, Japanese Kokai Publication Sho-63-254149, Japanese Kokai Publication Sho-64-22904, Japanese Kokai Publication Sho-64-38407 etc.

The isobutylene polymer having reactive silicon groups in the inside of the molecular chain can be produced by copolymerizing monomers, whose main component is isobutylene, with a vinylsilane or an allylsilane having reactive silicon groups.

The isobuthyene polymer having reactive silicon groups both at the ends and in the inside of the molecular chain can be produced by copolymerizing with a vinylsilane or allylsilane having reactive silicon groups upon polymerizing for production of an isobutylene polymer having reactive silicon groups at the chain ends, and then introducing reactive silicon groups at the chain ends.

As examples of a vinylsilane and allysilane having reactive silicon groups, vinyltrichlorosilane, vinylmethyldichlorosilane, vinyldimethylchlorosilane, vinylmethyldimethoxysilane, divinyldichlorosilane, divinyldimethoxysilane, allyltrichlorosilane, allylmethyldichlorosilane, allyldimethylchlorosilane, allyldimethylmethoxysilane, diallyldichlorosilane, diallyldimethoxysilane, γ-methacryloyloxypropyltrimethoxysilane, γ-methacryloyloxypropylmethyldimethoxysilane and the like can be mentioned.

The hydrogenated polybutadiene having olefin groups at the chain ends (hereinafter, referred as an olefin-terminated hydrogenated polybutadiene) can be produced by converting hydroxyl groups of the hydroxyl-terminated hydrogenated polybutadiene into oxymetal groups such as —ONa or —OK, and then reacting with the halogenated organic compound represented by the general formula (3):

(wherein Y represents a halogen atom such as chlorine and iodine, $R^3$ is a divalent organic group represented by —$R^4$—, —$R^4$—OCO— or —$R^4$—CO— ($R^4$ is a divalent hydrocarbon group of 1–20 carbon atoms, and alkylene, cycloalkylene, arylene or aralkylene groups are preferable) and a divalent group selected from —$CH_2$— or —R"—$C_6H_5$—$CH_2$—(R" is a hydrocarbon group of 1–10 carbon atoms) is especially preferable).

As a process for converting the terminal hydroxyl groups of the hydroxyl-terminated hydrogenated polybutadiene into oxymetal groups, a process for reacting with an alkali metal such as Na or K; hydrogenated metal such as NaH; metal alkoxide such as NaOCH3; alkali hydroxide such as NaOH or KOH; or the like can be mentioned.

By the process mentioned above, the olefin-terminated hydrogenated polybutadiene can be obtained, which has almost the same molecular weight as the hydroxyl-terminated hydrogenated polybutadiene used as a raw materials. If polymers of more high molecular weight is necessary, however, the molecular weight can be increased by reacting with a polyhalogenated organic compound containing two or more halogen atoms in a molecule, such as methylene chloride, bis(choloromethyl)benzene and bis(chloromethyl) ether before reacting with the halogenated organic compound of the general formula (3), and then reacting with the halogenated organic compound to give an olefin-terminated hydrogenated polybutadiene of more high molecular weight.

As examples of the above-mentioned halogenated organic compound, allylchloride, allylbromide, vinyl(chloromethyl) benzene, allyl (chloromethyl)benzene, allyl(b romomethyl) benzene, allyl chloromethyl ether, allyl(chloromethoxy) benzene, 1-butenyl chloromethyl ether, 1-hexenyl (chloromethoxy)benzene, allyloxy-(chloromethyl)benzene and the like can be mentioned, but the above-mentioned halogenated organic compound are not limited to these examples. Among these, allylchloride is preferable because it is inexpensive and easy to react.

The introduction of reactive silicon groups to the olefin-terminated hydrogenated polybutadiene can be performed by addition reaction of the hydrosilane compound by using of a platinum catalyst like in case of the isobutylene polymer having reactive silicon groups at the molecular ends.

When the saturated hydrocarbon polymer having reactive silicon groups does not contain substantially any unsaturated carbon bonds except those of aromatic rings in a molecule as mentioned above, weather resistance is remarkably improved, compared with the cured products from organic polymers having unsaturated bonds or from conventional rubbery polymers such as oxyalkylene polymers. Furthermore, since the said polymer is a hydrocarbon polymer, it has not only good properties in moisture shielding and water resistance and has an excellent adhesive property for various inorganic substrates such as glass and aluminum, but also gives a cured product having low moisture shielding.

The preferable content of the saturated hydrocarbon polymer having reactive silicon groups is 10% or more in the whole curable compound of the invention, more preferably 20% or more, and 30% or more is particularly preferable.

The silanol condensation catalyst, which is contained in the component (B) of the invention, is widely known. As concrete example can be mentioned silanol condensation catalyst including titanates such as tetrabutyltitanate and tetrapropyltitaneta; tin carboxylic salts such as dibutyltin dilaulate, dibutyltin diacetate, dibutyltin diethylhexanoate, dibutyltin dioctanoate, dibutyltin dimethylmaleate, dibutyltin diethylmaleate, dibutyltin dibutylmaleate, dibutyltin diisooctylmaleate, dibutyltin ditridecylmaleate, dibutyltin dibenzylmaleate, dibutyltin maleate, dibutyltin diacetate, tin octanoate, dioctyltin distealeate, dioctyltin dilaulate, dioctyltin diethylmaleate, dioctyltin diisooctylmaleate, dioctyltin divaccetate, and tin naphthenoate; tinalkoxide such as dibutyltin dimethoxide, dibutyltin diphenoxide, and dibutyltin diisoproxide; tin oxide such as dibutyltin oxide, and dioctyltin oxide; reactant between dibutyltin oxide and phthalic ester; dibutyltin bisacetylacetonate; organoaluminum compound such as aluminum trisacetylacetonate, aluminum trisethylacetoacetate, and diisopropoxyaluminum ethylacetoacetate; chelate compound such as zirconum tetraacetylacetonate, and titan tetraacetylacetonate; lead octanoate; amine compound or its salt with carboxylic acids or the like, such as butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris (dimethylaminomethyl)phenol, morphorine, N-methylmorphrine, 2-ethyl-4-methylimidazole, and 1,8-diazabicyclo-(5,4,0)-undecene-7 (DBU); a low-molecular-weight polyamide resin obtained from an excess of polyamine and a polybasic acid; reactant between an excess of polyamine and an epoxide; silane-coupling agent having amino groups, such as γ-(-aminopropyltrimethoxysilane, and N-(β-aminoethyl)aminopropylmethyldimethoxysilane; or the like, and further the known silanol condensation catalyst such as acidic or basic catalyst can be also mentioned as examples thereof.

Among these catalysts, if a quick-curing at room temperature is necessary, it is better to use a tetravalent tin compound, in particular to use dialkyltin dialkoxide. It is especially preferable to use dibutyltin bisacetylacetonate, dibutyltin dimethoxide and dibutyltin dipropoxide. Since the tetravalent tin compound such as dialkyltin dialkoxide is not deactivated even if it is mixed with water or a hydrated metal salt in a curing agent and lowering of curing rate does not happen after storage, so that the effect of the present invention is displayed remarkably when the tetravalent tin compound is used as a curing catalyst. These catalysts can be used singly or in combination of two or more.

A preferable blended amount of the silanol curing catalyst in this component (B) is about 0.1 to 20 parts (parts by weight, same hereinafter) per 100 parts of the saturated hydrocarbon polymer in the component (A), and 1 to 10 parts is more preferable. When a blended amount of the silanol curing catalyst is less than this range, curing rate may be decreased and it sometimes occurs that curing reaction does not proceed sufficiently. On the contrary, when a blended amount of the silanol curing catalyst exceeds this range, not only a local generation of heat or foaming occur in curing and thus it is difficult to obtain a good cured product, but also it is not desirable in view of an operating efficiency because a pot life becomes too short.

The water or the hydrated metal salt in the components (B) of the invention acts as a source of water necessary to condensation curing of the saturated hydrocarbon polymer in the component (A), and accelerates the formation of the crosslinked structure.

When the source of water is other than water, a hydrated metal salt on a market can be used broadly, and as an example thereof, a hydrated alkaline earth metal salt or a hydrated other metal salt can be mentioned.

As an concrete example can be mentioned $Al_2O_3.H_2O$, $Al_2O_3.3H_2O$, $Al_2(SO_4)_3.18H_2O$, $Al_2(C_2O_4)_3.4H_2O$, $AlNa(SO_4)_2.12H_2O$, $AlK(SO_4)_2.12H_2O$, $BaCl_2.2H_2O$, $Ba(OH)_2.8H_2O$, $CaSO_4.2H_2O$, $CaS_2O_3.6H_2O$, $Ca(NO_3)_2.4H_2O$, $CaHPO_4.2H_2O$, $Ca(C_2O_4).H_2O$, $Co(NO_3)_2.6H_2O$, $Co(CH_3COO)_2.4H_2O$, $CuCl_2.2H_2O$, $CuSO_4.5H_2O$, $FeCl_2.4H_2O$, $FeCl_3.6H_2O$, $FeSO_4.7H_2O$, $Fe(NH_4)(SO_4)_2.12H_2O$, $K_2CO_3.15H_2O$, $KNaCO_3.6H_2O$, $LiBr.2H_2O$, $Li_2SO_4.H_2O$, $MgSO_4.H_2O$, $MgSO_4.7H_2O$, $MgHPO_4.7H_2O$, $Mg_3(PO_4)_2.8H_2O$, $MgCO_3.3H_2O$, $Mg_4(CO_3)_3(OH)_2.3H_2O$, $MoO_3.2H_2O$, $NaBr.2H_2O$, $Na_2SO_3.7H_2O$, $Na_2SO_4.10H_2O$, $Na_2S_2O_3.5H_2O$, $Na_2S_2O_6.2H_2O$, $Na_2B_4O_7.10H_2O$, $NaHPO_3.2.5H_2O$, $Na_3PO_4.12H_2O$, $Na_2CO_3.H_2O$, $Na_2CO_3.7H_2O$, $Na_2CO_3.10H_2O$, $NaCH_3COO.3H_2O$, $NaHC_2O_4.H_2O$, $NiSO_4.6H_2O$, $NiC_2O_4.2H_2O$, $SnO_2.nH_2O$, $NiC_2O_4.2H_2O$, $Sn(SO_4)_2.2H_2O$, $ZnSO_3.2H_3O$, $ZnSO_4.7H_2O$, $Zn_3(PO_4)_2.4H_2O$, $Zn(CH_3COO)_2.2H_2O$ or the, but it is not limited to these.

Among these, a hydrated alkali metal salt and a hydrated alkaline earth metal salt is preferable, and a concrete example can be mentioned by $MgSO_4.7H_2O$, $Na_2CO_3.10H_2O$, $Na_2SO_4.10H_2O$, $Na_2S_2O_3.5H_2O$, $Na_3PO_4.12H_2O$, $Na_2B_4O_7.10H_2O$, and the like.

The water used for the invention is preferably used within the range of 0.01 to 25 parts per 100 parts of the saturated hydrocarbon polymer having reactive silicon groups. In particular, 0.05 to 15 parts, especially 0.2 to 5 parts is preferable.

The hydrated metal salt used for the invention is preferably used within the range of 0.01 to 50 parts per 100 parts of the saturated hydrocarbon polymer having reactive silicon groups. In particular, 0.1 to 30 parts, especially 1 to 10 parts is preferable. The water and the hydrated metal salt mentioned above may be used singly or in combination with two or more.

Various additives can be used jointly in the curable compound of the invention. A typical additive is an adhesion promoter. As a representative example, a silane-coupling agent may be mentioned. However, an adhesion promoter other than the silane-coupling agent can also be used. The silane-coupling agent is a compound having silicon-containing groups (hereinafter, referred as a hydrolyzable silicon group), which have hydrolyzable groups bonded to the silicon atom and which are crosslinkable by forming siloxane bonds, and other functional groups.

As an example of this hydrolyzable silicon group, the group represented by the general formula (1), more preferably represented by the general formula (2), can be mentioned. As the hydrolyzable group, the above-mentioned group can be mentioned, but a methoxy or ethoxy group is preferable in that their hydrolysis rate is large. The preferable number of the hydrolyzable groups is two or more, and three or more is more preferable.

As a example the functional group other than the hydrolyzable silicon group, a primary, secondary and tertiary amine, a mercapto group, an epoxy group, a carboxyl group, a vinyl group, an isocyanate group, an isocyanurate, a halogen or the like can be mentioned. Among these, a primary, secondary and tertiary amineis, an epoxy group, an isocyanate group and an isocyanurate are preferable, and, in particular, an isocyanate group and an epoxy group are more preferable.

As an concrete example of the silane-coupling agent can be mentioned an amino-containing silane such as γ-aminopropyltrimethoxysilane, γ-aminopropyltriethoxysilane, γ-aminopropylmethyldimethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropyltriethoxysilane, γ-ureidopropylpropyltrimethoxysilane, n-β-(n-vinylbenzylaminoethyl)-γ-aminopropyltriethoxysilane, and γ-anilinopropyltrimethoxysilane; a mercaptocontaining silane such as γ-mercaptopropyltrimethoxysilane, γ-mercaptopropyltriethoxysilane, γ-mercaptopropylmethyldimethoxysilane, and γ-mercaptopropylmethyldiethoxysilane; an epoxycontaining silane such as γ-glicidoxypropyltrimethoxysilane, γ-glicidoxypropyltriethoxysilane, γ-glicidoxypropylmethyldimethoxysilane, and β-(3,4-epoxycyclohexyl)ethyltriethoxysilan; carboxysilane such as β-carboxyethyltriethoxysilane, β-carboxyethylphenylbis(2-methoxyethoxy)silane, and n-β-(n-carboxymethylaminoethyl)-γ-aminopropyltrimethoxysilane; a silane containing vinyl type unsaturated groups such as vinyltrimethoxysilane, vinyltriethoxysilane, γ-methacryloyloxypropylmethyldimethoxysilane, and γ-acroyloxypropyl-methyltriethoxysilane; a halogen-containing silane such as γ-chloropropyltrimethoxysilane; isocyanurate silane such as tris(trimethoxysilyl) isocyanurate; isocyanate-containing silane such as γ-isocyanatepropyltrimethoxysilane, γ-isocyanatepropyltriethoxysilane or the like.

The derivatives obtained by modifying these, such as an amino-modified silyl polymer, a silylated amino polymer, an unsaturated amino silane complex, a blocked isocyanate silane, a phenylamino long-chain amino silane, an aminosilylated silicone and a silylated polyester, can be also used as the silane-coupling agent.

Such a silane coupling agents is easy to decompose in the presence of moisture, but it can exist stably if it is added to the component (A) of the compound of the invention.

Besides, a compound having epoxy groups or isocyanate groups in a molecule, including polyisocyanate compound, can be also used as an adhesion promoter other than a silane-coupling agent.

The adhesion promoter in the invention can be used within the range of 0.01 to 20 parts (parts by weight, same hereinafter) per 100 parts of the saturated hydrocarbon polymer having reactive silicon groups. In particular, the range of 0.1 to 10 parts is preferable. The said adhesion promoter may be used alone or in combination with two or more.

The compound of the invention can be further modified by blending various fillers. As an example of such a filler, a reinforcing filler such as fumed silica, precipitated silica, silicic anhydride, hydrated silicic acid, talc and carbon black; a filler such as heavy A carbonate, precipitated calcium carbonate, diatomaceous earth, baked clay, clay, titanium oxide, bentonite, organic bentonite, iron (II) oxide, zinc oxide, and activated zinc white; a fiber-like filler such as glass fiber and filament ; or the like, can be mantioned.

When a curable compound of high strength is desired by using these fillers, 1 to 100 parts of the reinforcing filler such as fumed silica, precipitated silica, silicic anhydride, hydrated silicic acid, talc and carbon black, per 100 parts of the saturated hydrocarbon polymer in the component (A) of the invention, can be used to obtain a cured product of high strength and high modulus in mechanical property.

On the contrary, when a cured product of low modulus and high elongation is needed, 5 to 400 parts of the filler such as ground calcium carbonate, precipitated calcium carbonate, diatomaceous earth, baked clay, clay, titanium oxide, bentonite, organic bentonite, iron (II) oxide, zinc oxide and activated zinc white, per 100 parts of the saturated hydrocarbon polymer in the component (A) of the invention can be used.

These fillers may be used alone or in combination with two or more. The fillers may be added to the component (A) or to (B) or to both (A) and (B).

It is more useful that a plasticizer is used together with the fillers in the compound of the invention because the elongation of the cured product can be increased and a large amount of the fillers can be mixed. As the said plasticizer, a conventional plasticizer can be used, but a plasticizer compatible with the saturated hydrocarbon polymer used in the invention is desirable.

As an concrete example of the plasticizer can be mentioned process oil, polybutene, hydrogenated polybutene, α-methylstyrene oligomer, liquid polybutadiene, hydrogenated liquid polybutadiene, paraffin oil, naphtene oil, atactic polypropylene or the like can be mentioned, and, among these is preferable a hydrocarbon compound not containing unsaturated bonds, such as the process oil, hydrogenated polybutene, hydrogenated liquid polybutadiene, paraffin oil, naphtene oil or the like.

If necessary, an antioxidant, an ultraviolet absorbing agent, a light stabilizer, a flame-retardation-imparting agent, a thixotropic agent, a pigment, a surface active agents and the like can be properly added to the compound of the invention.

The compound of the invention can be used as any of a two-part compound or an at least three-part compound. In case of using it as a two-part compound, for example, it may be divided into a main ingredient, the component (A) of the invention, to which a filler, a plasticizer and the like are added, and a curing agent, the component (B) of the invention, to which a filler, a plasticizer and the like are added. If both ingredients are mixed together just before use, the initial properties of the cured product can be stably realized even after long storage.

The compound of the invention is mainly useful as an elastic curable compound, and it can be used for sealing uses in such fields as electronics and electricity, water-proofing in engineering works, a building, a ship, a car and a road. It can be also used as various adhesive compounds because it can be adhered to various substrates such as glass, building stones, ceramic, wood, synthetic resin, and metal without using primers.

The curable compound of the invention is useful as a sealing material for the double layer glass or for SSG because it reveals stable adhesive property for a long term for float glass, various surface-treated heat-ray reflecting glass, pure aluminum, anode oxidized aluminum or the like.

Though the compound of the invention contains water or a hydrated metal salt as a source of water necessary for curing as well as a silanol condensation catalyst, the curablity (curing rate) of the compound is not almost decreased after storage. Furthermore, a compound having the reactive silicon groups easy to react with water, such as a silane-coupling agent, can be incorporated to the compound, and the cross-linking reaction does not proceed and, thus, the viscosity of the compound does not increase during storage.

BEST MODE FOR CARRYING OUT THE INVENTION

The following examples are further illustrative of the present invention, but are by no means limitative of the scope of the invention. Producing Example 1 Production of a saturated hydrocarbon polymer 7.5 mmol of P-DCC (the compound A described below) was put into 1-L autoclave of pressure glass. The agitator, three-way stop-cock and vacuum line were attached to the autoclave, and then the inside air was substituted with nitrogen gas.

330 ml of toluene and 141 ml of hexane dried by molecular sieve treatment were introduced into the autoclave by using a syringe with nitrogen gas flowing through a way of three-way stop-cock. Subsequently 3.0 mmol of α-picolin was added as an additive.

After attaching a liquefied gas-collecting tube of a pressure glass with a needle valve, which contained 113 g of isobutylene dehydrated by passing through a column filled with barium oxide, to three-way stop-cock, a vessel itself was immersed into a dry ice-acetone bath of −70° C., and was cooled for one hour with agitating the inside of the polymerization vessel. After cooling and reducing the pressure of the inside by vacuum line, isobutylene was introduced into the polymerization container from the liquefied gas-collecting tube of pressure glass by opening the needle valve. The pressure was returned to a normal pressure by introducing nitrogen gas from one way of three-way stop-cock.

Next, after confirming that the temperature of the inside of the polymerization vessel was kept stably at −70° C., polymerization was started by adding 7.18 g (3.8 mmol) of TiCl4 from three-way stop-cock by using a syringe, and after 2 hours, 2.57 g (22.5 mmole) of allyltrimethylsilane was added thereto. After another hour polymerization, the catalyst was deactivated by pouring the reaction mixture into water. The organic layer was then washed three times with pure water, separating it and removing the solvent by reducing pressure to obtain allyl-terminated isobutylene polymer.

The structure of compound A is now shown below.

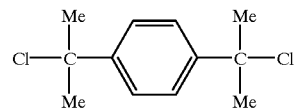

Subsequently, after dissolving 100 g of the thus-obtained allyl-terminated isoblutyleno polymer in 50 mL of n-heptane and heating the mixture to about 70° C., 1.2 [eq./allyl group] of methyldimethoxysilane and $1\times10^{-4}$ [eq./allyl group] of platinum (vinylsiloxane) complex were added in order to perform hydrosilylation reaction. The reaction was chased by FT-IR, and it was stopped after confirming that the absorption at 1640 cm$^{-1}$ originating from olefin was disappeared in about 4 hours.

The aimed isobutylene polymer having reactive silicon groups at both ends was obtained by reduced-pressure concentration of the reaction solution. The yield was calculated through the amount of the polymer thus obtained. The Mn and Mw/Mn were obtained by GPC method, and the terminal structure was obtained by measuring and comparing the strength of resonance signal of the proton belonged to each structure with 300 MHz $^1$H-NMR (the proton originating from the initiator: 6.5 to 7.5 ppm, methylproton bonded to the silicon atom originating from the polymer ends: 0.0 to 0.1 ppm and methoxy proton: 3.5 to 3.4). The analyzed value of the polymer was Mn=11416, Mn/Mw= 1.47 and Fn (silyl)=1.95 (the number average molecular weight is the relative value using the standard polystyrene and Fn (silyl) is the number of the terminal silyl functional groups per one molecule of the isobutylene polymer).

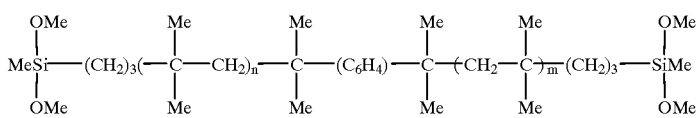

EXAMPLE 1 AND COMPARATIVE EXAMPLE 1

90 parts of paraffinic process oil (made by Idemitsu Kousan Co. Ltd., trade name Dyanaprocess PS-32), 180 parts of ground calcium carbonate (made by Shiroisi Calcium Co., Ltd., trade name P0320B), 50 parts of precipitated calcium carbonate (made by Shiraishi Industry Co., Ltd., trade name EDS-D10A), 100 parts of talc (made by Maruo Calcium Co., Ltd., trade name LMR), one part of anti-aging agent (made by Ciba Geigy Co., Ltd., trade name Iruganox 1010), one part of anti-aging agent (made by Sumitomo Chemistry Co., Ltd., trade name Sumisoap 400), one part of anti-aging agent (made by Sankyo Co., Ltd., trade name Sanol LS-765), three parts of light stabilizer (made by Sanshin Chem. Ind. Co. Ltd., trade name Sundant NBC), three parts of light curable resin (made by Toa Synthesis Co., Ltd., trade name Aronix M400), five parts of thixotropic agent (made by Kusumoto Chem. Ind. Co., Ltd., trade name Disbaron #305) and four parts of silane-coupling agent of γ-isocyanatepropyltriethoxysilane (made by Japan Unicar Co., Ltd., trade name A-1310) were added to 100 parts of the polymer obtained in Producing Example 1, and it was kneaded well with three paint rolls to obtain a main ingredient of Example 1.

Moreover, four parts of dibutyltin bisacetylacetonate as silanol condensation catalyst (made by Nitto Chem. Ind. Co. Ltd., trade name U-220), four parts of mirabilite ($Na_2SO_4.10H_2O$), ten parts of paraffinic process oil (made by Idemitsu Kousan Co., Ltd., trade name Dyanaprocess PS-32), 20 parts of ground calcium carbonate (made by Maruo Calcium Co., Ltd., trade name Snowlight SS) and 2.5 parts of carbon black (made by Mitsubishi Chem. Ind. Co., Ltd., trade name CB #30) were kneaded in a disposable cup by hands, and then the operation of stirring the mixture for ten minutes at 10,000 rpm by using an excel auto homogenizer made by Nippon Seiki Pro. Co., Ltd. was repeated three times to prepare a curing agent of Example 1.

Furthermore, the main ingredient of Example 1 to which four part of mirabilite ($Na_2SO_4.10H_2O$) was added, and a curing agent of Example 1 without mirabilite were used as a main ingredient and curing agent of Comparative Example 1, for the same examination as Example 1.

The compounds mentioned above were put into glass bottles and sealed respectively, and stored for one month in a perfect oven at 50° C. to measure the viscosities of the main ingredients. The measurement of the viscosity was performed by B type viscometer made by Tokyo Keiki Co., Ltd. (BS type) with using No. 7 rotor at 23° C.

The viscosities at 10 rpm of the main ingredients just after preparing were 7,632 poise for Example 1 and 8,928 poise for Comparative 5 Example 1. The viscosities at 10 rpm of the main ingredients after storage were 9,072 poise for Example 1 and above measuring limit (12,000 poise or greater) for Comparative Example 1. From this result, it is seen that the viscosity of the main ingredient blended with a hydrated metal salt is increased as compared with that without it, and that the viscosity of the main ingredient is increased after storage.

EXAMPLE 2 AND COMPARATIVE EXAMPLE 2

90 parts of paraffinic process oil (made by Idemitsu Kousan Co. Ltd., trade name Dyanaprocess PS-32), 180 parts of ground calcium carbonate (made by Shiraishi Calcium Co., Ltd., trade name PO320B), 50 parts of precipitated calcium carbonate (made by Shiraishi Industry Co., Ltd., trade name EDS-D10A), 100 parts of talc (made by Maruo Calcium Co., Ltd., trade name LMR), one part of anti-aging agent (made by Ciba Geigy Co., Ltd., trade name Iruganox 1010), one part of anti-aging agent (made by Sumitomo Chemistry Co., Ltd., trade name Sumisoap 400), one part of anti-aging agent (made by Sankyo Co., Ltd., trade name Sanol LS-765), three parts of light stabilizer (made by SannSinn Chemistry Co., Ltd., trade name Sundant NBC), three parts of light curing resin (Toa Synthesis Co. Ltd., trade name Aronix M400), five parts of thixotropic agent (made by Kusumoto Chem. Ind. Co., Ltd., trade name Disparon #305), four parts of silane-coupling agent of isocyanatepropyltriethoxysilane (made by Japan Unicar Co., Ltd., trade name A-1310) and two parts of γ-glicidoxypropyltrimethoxysilane (made by Japan Unicar Co., Ltd., trade name A-187) were added to 100 parts of the polymer prepared in Producing Example 1, and were kneaded well with three paint rolls to obtain a main ingredient of Example 2.

Moreover, four parts of dibutyltin bisacetylacetonate (made by Nitto Chem. Ind. Co. Ltd., trade name U-220), four parts of mirabilite ($Na_2SO_4.10H_2O$), ten parts of paraffinic process oil (made by Idemitsu Kousan Co., Ltd., trade name Dyanaprocess PS-32), 20 parts of ground calcium carbonate (made by Maruo Calcium Co., Ltd., trade name Snowlight SS) and 2.5 parts of carbon black (made by Mitsubishi Chem. Ind. Co., Ltd., trade name CB #30) were kneaded in a disposable cup with hands, and then the operation of stirring this mixture for ten minutes at 10,000 rpm by using an excel auto homogeneizer made by Nippon Seiki Prod. Co., Ltd. was repeated three times to prepare a curing agent of Example 2.

Furthermore, the main ingredient of Example 1 to which four part of mirabilite ($Na_2SO_4.10H_2O$) was added and a curing agent of Example 2 without mirabilite were used as a main ingredient and a curing agent of Comparative Example 2, for the same examination as Example 2.

The Compositions mentioned above were put into glass bottles and sealed respectively, and stored for one month in a perfect oven at 50° C. The change with time of the adhesive properties for various substrates and of mechanical properties were confirmed, just after preparation and after storage, by tests mentioned below and the results were shown in Table 1 and Table 2.

The sample for an tensile test was prepared according to the preparing method of an elongating and adhesive test sample in accordance with JIS A 5758-1992 rule. Thus, glass or aluminum base material was constructed in H shaped sample. Then, the main ingredient and the curing agent were weighed in a ratio equivalent to the ratio of the total parts of the main ingredient per the total parts of the curing ingredient, and the mixture was kneaded sufficiently and fillers was added thereto, and then it was cured in an oven. All curing conditions were (23° C.×7 day+50° C.×7 day). Base materials used for H shaped sample elongating test is three kind materials of float glass in accordance with JIS A 5758-1992 (made by Kouenn Co. Ltd.: specified by Association of Japanese Sealing Industry, dimension: 3×5×0.5 cm), pure aluminum in accordance with JIS H 4000 (made by Taiyuu Base Material Co. Ltd.; A1OOP, dimension: 5×5×0.2 cm) and heat ray-reflecting glass (trade name: KLS, dimension: 5×5×0.6 cm). These adhered materials were washed with methylethylketone (Wako Pure Chemical: the best quality) and wiped with a clean cotton cloth before blending with filler.

The sample prepared by the method mentioned above for H shaped sample elongating test was tested in a constant temperature room under the condition that an elongating rate was 50 mm/min, temperature of 23° C. and humidity of 65±5% in accordance with JlS A 5758-1992 rule on an elongation and adhesive property testing method. The percentages of cohesion fracture (CF), thin layer cohesion fracture (TCF) and adhesion fracture (AF) was evaluated by observing the fracture surface with eyes after elongating tests.

TABLE 1

Results of H shaped sample elongating tests using compounds just after preparing

| | Base Material | M50 kgf/cm² | TB kgf/cm² | EB % | Fractured state (%) | | |
|---|---|---|---|---|---|---|---|
| | | | | | CF | TCF | AF |
| Example 2 | FL | 6.14 | 7.80 | 79 | 100 | 0 | 0 |
| | PAl | 5.56 | 7.96 | 88 | 100 | 0 | 0 |
| | KLS | 5.97 | 7.79 | 82 | 99 | 1 | 0 |
| Comparative Example 2 | FL | 5.48 | 7.49 | 85 | 99 | 1 | 0 |
| | PAl | 4.94 | 8.13 | 107 | 94 | 5 | 1 |
| | KLS | 5.39 | 7.82 | 95 | 99 | 1 | 0 |

FL: float glass,
pAl: pure aluminum,
KLS: heat ray-reflecting glass,
M50: 50% elongation stress,
TB: fracture strength,
EB: elongation at fracture

TABLE 2

Results of H shaped sample elongating tests using compounds after storage

| | Base Material | M50 kgf/cm² | TB kgf/cm² | EB % | Fractured state (%) | | |
|---|---|---|---|---|---|---|---|
| | | | | | CF | TCF | AF |
| Example 2 | FL | 5.94 | 8.88 | 91 | 100 | 0 | 0 |
| | Pal | 5.47 | 8.39 | 93 | 97 | 0 | 3 |
| | KLS | 6.50 | 9.01 | 81 | 98 | 2 | 0 |
| Comparative Example 2 | FL | — | 2.62 | 30 | 1 | 0 | 99 |
| | pAl | — | 1.85 | 23 | 0 | 0 | 100 |
| | KLS | — | 1.32 | 15 | 0 | 0 | 100 |

FL: float glass,
pAl: pure aluminum,
KLS: heat ray-reflecting glass,
M50: 50% elongation stress,
TB: fracture strength,
EB: elongation at fracture As seen from Table 1 and Table 2, when the samples were prepared by using the compounds just after blending, the adhesive properties of Example 2 and Comparative Example 2 were excellent in various substrates. When the compounds were stored for one month at 50° C., however, the same adhesive property as the initial compound was maintained in Example 2, while the adhesive property of Comparative Example 2 was lowered after storage because all substrates showed an adhesion fracture. It can be also confirmed that the mechanical properties in Example 2 were not lowered and were maintained as compared with the initial values.

Besides, it took about ten hours until the hardness of the cured product from the compound of Example 2 reached to JIS hardness 20 when the compound of Example 2 was aged at 30° C.

EXAMPLE 3

A curing agent was prepared in the same manner as Example 2 except that four parts of dibutyltin dimethoxide (made by Aldrich Chem. Co., Ltd.) was used instead of U-220 which was the silanol catalyst of Example 2, and the same tests as Example 2 were performed by using the main ingredient used in Example 2. The results were shown in Table 3 and Table 4.

TABLE 3

Results of H shaped sample elongating tests using compounds just after preparing

| | Base Material | M50 kgf/cm² | TB kgf/cm² | EB % | Fractured state (%) | | |
|---|---|---|---|---|---|---|---|
| | | | | | CF | TCF | AF |
| Example 3 | FL | 4.42 | 7.70 | 130 | 100 | 0 | 0 |
| | pAl | 4.23 | 8.32 | 97 | 97 | 3 | 0 |
| | KLS | 4.60 | 7.26 | 97 | 97 | 3 | 0 |

FL: float glass,
pAl: pure aluminum,
KLS: heat ray-reflecting glass,
M50: 50% elongation stress,
TB: fracture strength,
EB: elongation at fracture

TABLE 4

Results of H shaped sample elongating tests using compounds after storage

| | Base Material | M50 kgf/cm² | TB kgf/cm² | EB % | Fractured state (%) | | |
|---|---|---|---|---|---|---|---|
| | | | | | CF | TCF | AF |
| Example 3 | FL | 4.50 | 8.34 | 133 | 98 | 0 | 2 |
| | pAl | 4.32 | 8.46 | 139 | 100 | 0 | 0 |
| | KLS | 4.69 | 8.41 | 125 | 100 | 0 | 0 |

FL: float glass,
pAl: pure aluminum,
KLS: heat ray-reflecting glass,
M50: 50% elongation stress,
TB: fracture strength,
EB: elongation at fracture From Table 3 and Table 4, the effects of adding the hydrated metal salt to the curing agent side were confirmed from the facts that there were no changes in the adhesive properties for various substrates and in mechanical properties before and after storage in case of Example 3 just like Example 2.

Besides, it took about four hours until the hardness of the cured product from the compound of Example 3 reached to JIS hardness 20 when the compound of Example 2 was aged at 30° C. Thus, it also confirmed that the compound used in Example 3 could be cured in more short time than that of Example 2 using U-220.

EXAMPLE 4

The same main ingredient as that of Example 2 was used and a curing agent was prepared as follows.

Four parts of dibutyltin dimethoxide (made by Aldrich Chem. Co., Ltd.) as a silanol catalyst, two parts of water (deionized water), 16 parts of paraffinic process oil (made by Idemitsu Kousan Co., Ltd., trade name Dyanaprocess PS-32), ten parts of ground calcium carbonate (made by Maruo Calcium Co., Ltd., trade name Snowlight SS) and 2.5 parts of carbon black (made by Mitsubishi Chem. Ind. Co., Ltd., trade name CB #30) were kneaded in a disposable cup by hands, and then the operation of stirring them for ten minutes at 10,000 rpm by using an excel auto homogeneizer made by Nippon Seiki Prod. Co., Ltd. was repeated three times to obtain a curing agent of Example 4. The same tests as Example 2 were performed and the results were shown in Table 5 and Table 6.

TABLE 5

Results of H shaped sample elongating tests using the compound of Example 4 just after preparation

| Base Material | | M30 | M50 | M100 | T max | E max | Fractured state (%) | | |
|---|---|---|---|---|---|---|---|---|---|
| | | (kgf/cm$^2$) | | | | % | CF | TCF | AF |
| Float | 1 | 4.17 | 5.96 | — | 8.42 | 86 | 100 | 0 | 0 |
| glass | 2 | 4.21 | 6.00 | — | 9.16 | 100 | 90 | 10 | 0 |
| | Mean | 4.19 | 5.98 | — | 8.79 | 93 | 95 | 5 | 0 |
| Pure | 1 | 3.77 | 5.48 | 8.78 | 8.88 | 105 | 95 | 5 | 0 |
| alumi- | 2 | 3.81 | 5.51 | 8.82 | 9.33 | 114 | 90 | 10 | 0 |
| num | Mean | 3.79 | 5.49 | 8.80 | 9.11 | 110 | 93 | 8 | 0 |
| Heat | 1 | 4.13 | 5.84 | 8.83 | 8.84 | 101 | 95 | 5 | 0 |
| ray- | 2 | 4.10 | 5.86 | — | 8.80 | 98 | 97 | 3 | 0 |
| reflect-ing glass | Mean | 4.12 | 5.85 | (8.83) | 8.82 | 100 | 96 | 4 | 0 |

Tmax: maximum tensile stress,
Emax: elongation at the maximum load,
M30: 30% elongation stress,
M50: 50% elongation stress,
M100: 100% elongation stress,

TABLE 6

Results of H shaped sample elongating tests using the compound of Example 4 after storage

| Base Material | | M30 | M50 | M100 | T max | E max | Fractured state (%) | | |
|---|---|---|---|---|---|---|---|---|---|
| | | (kgf/cm$^2$) | | | | % | CF | TCF | AF |
| Float | 1 | 4.17 | 5.96 | — | 8.42 | 86 | 100 | 0 | 0 |
| glass | 2 | 4.21 | 6.00 | — | 9.16 | 100 | 90 | 10 | 0 |
| | Mean | 4.19 | 5.98 | — | 8.79 | 93 | 95 | 5 | 0 |
| Pure | 1 | 3.77 | 5.48 | 8.78 | 8.88 | 105 | 95 | 5 | 0 |
| alumi- | 2 | 3.81 | 5.51 | 8.82 | 9.33 | 114 | 90 | 10 | 0 |
| num | Mean | 3.79 | 5.49 | 8.80 | 9.11 | 110 | 93 | 8 | 0 |
| Heat | 1 | 4.13 | 5.84 | 8.83 | 8.84 | 101 | 95 | 5 | 0 |
| ray- | 2 | 4.10 | 5.86 | — | 8.80 | 98 | 97 | 3 | 0 |
| reflect-ing glass | Mean | 4.12 | 5.85 | (8.83) | 8.82 | 100 | 96 | 4 | 0 |

Tmax: maximum tensile stress,
Emax: elongation at the maximum load,
M30: 30% elongation stress,
M50: 50% elongation stress,
M100: 100% elongation stress, From Table 5 and Table 6, the effects of adding water to the curing agent side were confirmed from the facts that there were no changes in the adhesive properties for various substrates and in mechanical properties before and after storage in case of Example 4 just like Example 2.

Besides, it took about four hours until the hardness of the cured product from the compound of Example 4 reached to JIS hardness 20 when the compound of Example 4 was aged at 30° C. Thus, it also confirmed that the compound used in Example 4 could be cured in nearly same short time as that of Example 3.

EXAMPLES 5 to 8

90 parts of paraffinic process oil (made by Idemitsu Kousan Co. Ltd., trade name Dyanaprocess PS-32), 180 parts of ground calcium carbonate (made by Shiraishi Calcium Co., Ltd., trade name PO320B), 50 parts of precipitated calcium carbonate (made by Shiraishi Industry Co., Ltd., trade name EDS-D10A), 100 parts of talc (made by Maruo Calcium Co., Ltd., trade name LMR), one part of anti-aging agent (made by Ciba Geigy Co., Ltd., trade name Iruganox 1010), one part of anti-aging agent (made by Sumitomo Chemistry Co., Ltd., trade name Sumisoap 400), one part of anti-aging agent (made by Sankyo Co., Ltd., trade name Sanol LS-765), three parts of light stabilizer (made by Sanshin Chem. Ind. Co. Ltd., trade name Sundant NBC), five parts of thixotropic agent (made by Kusumoto Chem. Co., Ltd., trade name Disparon #305), four parts of silane-coupling agent (made by Japan Unicar Co., Ltd., trade name A-1310) and two parts of silane-coupling agent (made by Japan Unicar Co., Ltd., trade name A-187) were added 30 to 100 parts of the polymer prepared in Producing Example 1 and kneaded well with three paint rolls. Thus, the main ingredient of Examples 5 to 7 were prepared.

Four parts of silanol condensation catalyst (made by Nitto Chem. Ind. Co. Ltd., trade name U-220), four parts of mirabilite (Na$_2$SO$_4$.10H$_2$O), ten parts of paraffinic process oil (made by Idemitsu Kousan Co., Ltd., trade name Dyanaprocess PS-32), 20 parts of ground calcium carbonate (made by Maruo Calcium Co., Ltd., trade name Snowlight SS) and 2.5 parts of carbon black (made by Mitsubishi Chem. Ind. Co., Ltd., trade name CB #30) were mixed in a disposal cup by hands, and then the operation of stirring them for ten minutes at 10,000 rpm by using an excel auto homogeneizer made by Nippon Seiki Prod. Co., Ltd. was repeated three times to prepare a curing agent of Example 5.

Curing agents of Examples 6, 7 and 8 were prepared respectively by using six parts of hypo (Na$_2$S$_2$O$_3$.5H$_2$O), six parts of magnesium sulfate (MgSO$_4$.7H$_2$O) and four parts of phosphoric acid sodium (NasPO$_4$.12H$_2$O) as a hydrated metal salt instead of mirabilite (Na$_2$SO$_4$.10H$_2$O) in the curing agent of Example 5, and the same evaluating tests as Example 2 were performed. The results were shown in Table 7 and Table 8.

TABLE 7

Results of H shaped sample elongating tests using the compound just after preparation

| | Base Material | M50 kgf/cm$^2$ | TB kgf/cm$^2$ | EB % | Fractured state (%) | | |
|---|---|---|---|---|---|---|---|
| | | | | | CF | TCF | AF |
| Example 5 | FL | 4.62 | 6.77 | 90 | 100 | 0 | 0 |
| | KLS | 4.67 | 6.63 | 84 | 100 | 0 | 0 |
| Example 6 | FL | 4.77 | 6.96 | 91 | 100 | 0 | 0 |
| | KLS | 4.73 | 6.69 | 88 | 100 | 0 | 0 |
| Example 7 | FL | 4.45 | 6.22 | 86 | 100 | 0 | 0 |
| | KLS | 4.64 | 6.06 | 80 | 100 | 0 | 0 |
| Example 8 | FL | 4.92 | 7.11 | 87 | 98 | 2 | 0 |
| | KLS | 4.75 | 6.70 | 88 | 100 | 0 | 0 |

FL: float glass,
KLS: heat ray-reflecting glass,
M50: 50% elongation stress,
TB: fracture strength,
EB: elongation at fracture

TABLE 8

Results of H shaped sample elongating tests using the compound after storage

| | Base Material | M50 kgf/cm$^2$ | TB kgf/cm$^2$ | EB % | Fractured state (%) | | |
|---|---|---|---|---|---|---|---|
| | | | | | CF | TCF | AF |
| Example 5 | FL | 4.912 | 7.40 | 90 | 100 | 0 | 0 |
| | KLS | 5.20 | 7.29 | 83 | 99 | 1 | 0 |
| Example 6 | FL | 5.51 | 7.71 | 80 | 100 | 0 | 0 |
| | KLS | 5.63 | 7.45 | 74 | 100 | 0 | 0 |

TABLE 8-continued

Results of H shaped sample elongating tests using the compound after storage

|  | Base Material | M50 kgf/cm² | TB kgf/cm² | EB % | Fractured state (%) | | |
|---|---|---|---|---|---|---|---|
|  |  |  |  |  | CF | TCF | AF |
| Example 7 | FL | 5.22 | 8.45 | 99 | 100 | 0 | 0 |
|  | KLS | 5.31 | 7.94 | 87 | 100 | 0 | 0 |
| Example 8 | FL | 4.78 | 7.69 | 102 | 100 | 0 | 0 |
|  | KLS | 5.12 | 7.76 | 96 | 100 | 0 | 0 |

FL: float glass,
KLS: heat ray-reflecting glass,
M50: 50% elongation stress,
TB: fracture strength,
EB: elongation at fracture From Table 7 and Table 8, since there were no changes in the adhesive properties for various substrates and in mechanical properties before and after storage in case of Examples 5 to 8 just like Example 2, the stability of the compounds were confirmed in Examples 5 to 8 even if kind of a hydrated alkali metal salt and hydrated alkali earth metal salt added to the curing agent side is varied.

We claim:

1. A curable compound comprising at least two components (A) and (B) described below; (A) a main ingredient which contains a saturated hydrocarbon polymer containing silicon-containing groups which have hydrolyzable groups bonded to the silicon atom and which are crosslinkable by forming siloxane bonds, and (B) a curing agent containing a dialkyltin dialkoxide and a hydrated metal salt.

2. The curable compound according to claim 1, wherein the saturated hydrocarbon polymer in the main ingredient of the component (A) is an isobutylene polymer.

3. The curable compound according to claim 1, wherein the silicon-containing group in the main ingredient of the component (A), which has hydrolyzable groups bonded to the silicon atom and which is crosslinkable by forming a siloxane bond, is a group represented by the general formula (1)

$$\left(\begin{array}{c} R^1_{2-b} \\ | \\ Si-O \\ | \\ X_b \end{array}\right)_m \begin{array}{c} R^2_{3-a} \\ | \\ Si-X_a \end{array} \quad (1)$$

wherein $R_1$ and $R^2$ each is independently an alkyl group of carbon atoms 1 to 20, an aryl group of carbon atoms 6 to 20, an arakyl group of carbon atoms 7 to 20 or a triorganosiloxy group represented by $(R')_3SiO$—(R's each is independently a hydrocarbon group of carbon atoms 1 to 20), X is a hydrolyzable group, a is either 0, 1 or 2, b is either 0,1 or 2 and a and b do not become 0 simultaneously, and m is 0 or an integer of 1 to 19.

4. The curable compound according to claim 1, wherein the hydrated metal salt in the curing agent of the component (B) is a hydrated alkali metal salt or a hydrated alkaline earth metal salt.

5. The curable compound according to claim 1, wherein the main ingredient of the component (A) further contains a silane-coupling agent.

6. The curable compound according to claim 5, wherein the silane-coupling agent is a compound having silicon-containing groups, which have hydrolyzable groups bonded to the silicon atom and which are crosslinkable by forming siloxane bonds, and at least one group selected from the group consisting of a primary amine, a secondary amine, a tertiary amine, an epoxy group, an isocyanate group and an isocyanurate.

7. The curable compound according to claim 5 wherein the saturated hydrocarbon polymer in the main ingredient of the component (A) is an isobutylene polymer, and the silane-coupling agent in the main ingredient of the component (A) is a compound having silicon-containing groups, which have hydrolyzable groups bonded to the silicon atom and which are crosslinkable by forming siloxane bonds, and at least one group selected from the group consisting of a primary amine, a secondary amine, a tertiary amine, an epoxy group, an isocyanate group and an isocyanurate.

* * * * *